(12) United States Patent
Fukae et al.

(10) Patent No.: US 11,441,209 B2
(45) Date of Patent: Sep. 13, 2022

(54) CEMENTED CARBIDE AND CUTTING TOOL INCLUDING SAME

(71) Applicant: Sumitomo Electric Hardmetal Corp., Itami (JP)

(72) Inventors: Kosuke Fukae, Itami (JP); Yasuki Kido, Itami (JP); Masami Watanabe, Itami (JP); Shinya Imamura, Itami (JP)

(73) Assignee: SUMITOMO ELECTRIC HARDMETAL CORP., Itami (JP)

( * ) Notice: Subject to any disclaimer, the term of this patent is extended or adjusted under 35 U.S.C. 154(b) by 0 days.

(21) Appl. No.: 17/599,570

(22) PCT Filed: Mar. 23, 2021

(86) PCT No.: PCT/JP2021/011861
§ 371 (c)(1),
(2) Date: Sep. 29, 2021

(87) PCT Pub. No.: WO2021/210357
PCT Pub. Date: Oct. 21, 2021

(65) Prior Publication Data
US 2022/0090237 A1    Mar. 24, 2022

(30) Foreign Application Priority Data
Apr. 15, 2020    (JP) ............................. JP2020-072993

(51) Int. Cl.
*C22C 29/08*    (2006.01)
*B26D 1/00*    (2006.01)

(52) U.S. Cl.
CPC ............ *C22C 29/08* (2013.01); *B26D 1/0006* (2013.01); *B26D 2001/002* (2013.01)

(58) Field of Classification Search
None
See application file for complete search history.

(56) References Cited

U.S. PATENT DOCUMENTS

| | | | |
|---|---|---|---|
| 8,056,652 B2* | 11/2011 | Lockwood | E21B 10/50 175/425 |
| 2008/0202821 A1* | 8/2008 | McClain | C22C 26/00 175/434 |

(Continued)

FOREIGN PATENT DOCUMENTS

| | | |
|---|---|---|
| JP | 2012-86298 A | 5/2012 |
| JP | 2016-87742 A | 5/2016 |

(Continued)

OTHER PUBLICATIONS

International Search Report and Written Opinion dated Jun. 15, 2021, received for PCT Application PCT/JP2021/011861, Filed on Mar. 23, 2021, 13 pages including English Translation.

(Continued)

*Primary Examiner* — Kenneth E Peterson
(74) *Attorney, Agent, or Firm* — Xsensus LLP

(57) ABSTRACT

A cemented carbide includes first hard phase grains, second hard phase grains, third hard phase grains, and a metal binder phase, wherein the cemented carbide has a total of 70 unit regions, the number of unit regions each having a percentage of less than 0.43% or more than 2.43% is ≤10 among the total of 70 unit regions, the percentage being a percentage of the total number of the second and the third hard phase grains in each unit region with respect to the total number of the second and the third hard phase grains in the total of 70 unit regions, and in a total of 10 unit regions existing in a fourth row in a longitudinal direction, a percentage of the number of the third hard phase grains with respect to the total number of the second and the third hard phase grains is 5% to 15%.

8 Claims, 3 Drawing Sheets

(56) References Cited

U.S. PATENT DOCUMENTS

| | | |
|---|---|---|
| 2012/0131820 A1* | 5/2012 | Brufau Guinovart ....................... E02F 3/8152 37/450 |
| 2013/0036866 A1 | 2/2013 | Tamura et al. |
| 2018/0178283 A1* | 6/2018 | Jiang ..................... C22C 19/058 |
| 2018/0222804 A1 | 8/2018 | Kido et al. |
| 2020/0048747 A1* | 2/2020 | Michiuchi ............... B23B 51/00 |
| 2020/0291504 A1 | 9/2020 | Fukae et al. |
| 2021/0025038 A1 | 1/2021 | Fukae et al. |
| 2021/0260652 A1* | 8/2021 | Bose ....................... B22F 10/14 |

FOREIGN PATENT DOCUMENTS

| | | | |
|---|---|---|---|
| WO | 2011/136197 A1 | 11/2011 | |
| WO | 2017/191744 A1 | 11/2017 | |
| WO | 2019/207876 A1 | 10/2019 | |
| WO | 2020/070978 A1 | 4/2020 | |

OTHER PUBLICATIONS

Tanaka et al., "Otsu's Discriminant Analysis Method with Gray Level Co-Occurrence Histogram", Meeting on Image Recognition and Understanding (MIRU2011), Jul. 2011, pp. 93-96. (21 pages including English Translation).

* cited by examiner

FIG.2

| 8<br>1 | 9<br>0 | 6<br>0 | 15<br>2 | 8<br>0 | 3<br>0 | 13<br>2 | 10<br>0 | 11<br>0 | 6<br>1 |
|---|---|---|---|---|---|---|---|---|---|
| 13<br>0 | 12<br>0 | 14<br>2 | 6<br>1 | 2<br>0 | 8<br>0 | 12<br>1 | 6<br>0 | 21<br>3 | 9<br>0 |
| 10<br>2 | 5<br>1 | 2<br>0 | 9<br>1 | 15<br>2 | 7<br>0 | 9<br>1 | 13<br>2 | 5<br>0 | 8<br>0 |
| 8<br>2 | 9<br>0 | 10<br>1 | 5<br>0 | 18<br>3 | 5<br>1 | 15<br>2 | 10<br>1 | 9<br>0 | 8<br>0 |
| 10<br>2 | 13<br>1 | 13<br>2 | 10<br>2 | 10<br>0 | 5<br>1 | 12<br>1 | 10<br>1 | 13<br>2 | 8<br>0 |
| 9<br>2 | 7<br>1 | 10<br>0 | 5<br>1 | 8<br>0 | 2<br>0 | 9<br>0 | 14<br>2 | 8<br>1 | 7<br>1 |
| 10<br>1 | 19<br>4 | 8<br>1 | 10<br>2 | 13<br>1 | 5<br>0 | 9<br>1 | 13<br>2 | 9<br>1 | 14<br>1 |

| 1.23% | 1.23% | 0.82% | 2.33% | 1.09% | 0.41% | 2.05% | 1.37% | 1.50% | 0.96% |
|---|---|---|---|---|---|---|---|---|---|
| 1.78% | 1.64% | 2.19% | 0.96% | 0.27% | 1.09% | 1.78% | 0.82% | 3.28% | 1.23% |
| 1.64% | 0.82% | 0.27% | 1.37% | 2.33% | 0.96% | 1.37% | 2.05% | 0.68% | 1.09% |
| 1.37% | 1.23% | 1.50% | 0.68% | 2.87% | 0.82% | 2.33% | 1.50% | 1.23% | 1.09% |
| 1.64% | 1.92% | 2.05% | 1.64% | 1.37% | 0.82% | 1.78% | 1.50% | 2.05% | 1.09% |
| 1.50% | 1.09% | 1.37% | 0.82% | 1.09% | 0.27% | 1.23% | 2.19% | 1.23% | 1.09% |
| 1.50% | 3.15% | 1.23% | 1.64% | 1.92% | 0.68% | 1.37% | 2.05% | 1.37% | 2.05% |

8μm × 8μm — R

CEMENTED CARBIDE AND CUTTING TOOL INCLUDING SAME

CROSS-REFERENCE TO RELATED APPLICATIONS

The present application is based on PCT filing PCT/JP2021/011861, filed Mar. 23, 2021, which claims priority to JP 2020-072993, filed Apr. 15, 2020, the entire contents of each are incorporated herein by reference.

TECHNICAL FIELD

The present disclosure relates to a cemented carbide and a cutting tool including the cemented carbide.

BACKGROUND ART

As hard materials including titanium (Ti), a cemented carbide, a cermet, and the like have been known. These hard materials are excellent in wear resistance and have been therefore used suitably for cutting tools, wear-resistant tools, and the like. For example, WO 2011/136197 (Patent Literature 1) discloses a cermet including: a first hard phase composed of a composite carbonitride including Ti; a second hard phase composed of tungsten carbide (WC); and a binder phase mainly composed of one or both of cobalt (Co) and nickel (Ni). Further, WO 2017/191744 (Patent Literature 2) discloses a cemented carbide including: a first hard phase mainly composed of WC; and a second hard phase mainly composed of a composite carbonitride including Ti and W.

CITATION LIST

Patent Literature

PTL 1: WO 2011/136197
PTL 2: WO 2017/191744

SUMMARY OF INVENTION

A cemented carbide of the present disclosure includes first hard phase grains, second hard phase grains, third hard phase grains, and a metal binder phase, wherein each of the first hard phase grains includes tungsten carbide, each of the second hard phase grains has a core portion in a form of a grain and a peripheral portion that coats at least a portion of the core portion, the core portion is composed of a first composite carbonitride represented by $Ti_{1-X-Z}Nb_XM_ZC_{1-Y}N_Y$, the peripheral portion is composed of a second composite carbonitride, the second composite carbonitride being a carbonitride that has a composition different from a composition of the core portion and that at least includes titanium, niobium, and tungsten, the M represents at least one element selected from a group consisting of vanadium, chromium, and molybdenum, the X is more than or equal to 0.1 and less than or equal to 0.2, the Y is more than or equal to 0.3 and less than or equal to 0.6, the Z is more than or equal to 0 and less than or equal to 0.02, each of the third hard phase grains is composed of the first composite carbonitride, the metal binder phase includes an iron group element, the cemented carbide has a total of 70 unit regions, the total of 70 unit regions are provided by continuously arranging 7 unit regions in a longitudinal direction and 10 unit regions in a lateral direction in an electron microscope image obtained by imaging an arbitrary cross section of the cemented carbide at a magnification of 1500×, each of the unit regions being constituted of a square having each side of 8 μm, the number of unit regions each having a percentage of less than 0.43% or more than 2.43% is less than or equal to 10 among the total of 70 unit regions, the percentage is a percentage of the total number of the number of the second hard phase grains and the number of the third hard phase grains in each unit region with respect to the total number of the number of the second hard phase grains and the number of the third hard phase grains in the total of 70 unit regions, the number of the second hard phase grains in the unit region is the number of second hard phase grains having core portions each having a grain size of more than or equal to 0.2 μm and less than or equal to 3 μm in the unit region, the number of the third hard phase grains in the unit region is the number of third hard phase grains each having a grain size of more than or equal to 0.5 μm and less than or equal to 2.5 μm in the unit region, and in a total of 10 unit regions existing in a fourth row of the total of 70 unit regions in the longitudinal direction in the cemented carbide, a percentage of the number of the third hard phase grains each having a grain size of more than or equal to 0.5 μm and less than or equal to 2.5 μm with respect to the total number of the number of the second hard phase grains having the core portions each having a grain size of more than or equal to 0.2 μm and less than or equal to 3 μm and the number of the third hard phase grains each having a grain size of more than or equal to 0.5 μm and less than or equal to 2.5 μm is more than or equal to 5% and less than or equal to 15%.

A cutting tool of the present disclosure is a cutting tool including the above-described cemented carbide.

BRIEF DESCRIPTION OF DRAWINGS

FIG. 2 is a diagram showing the number of second hard phase grains having core portions each having a grain size of more than or equal to 0.2 μm and less than or equal to 3 μm (upper side) and the number of third hard phase grains each having a grain size of more than or equal to 0.5 μm and less than or equal to 2.5 μm (lower side) in each unit region provided in an electron microscope image.

FIG. 3 is an explanatory diagram showing, in a percentage, the total number of the second hard phase grains and the third hard phase grains in each unit region with respect to the total number of the second hard phase grains and the third hard phase grains in a total of 70 unit regions provided in the electron microscope image.

DETAILED DESCRIPTION

Figure 1:
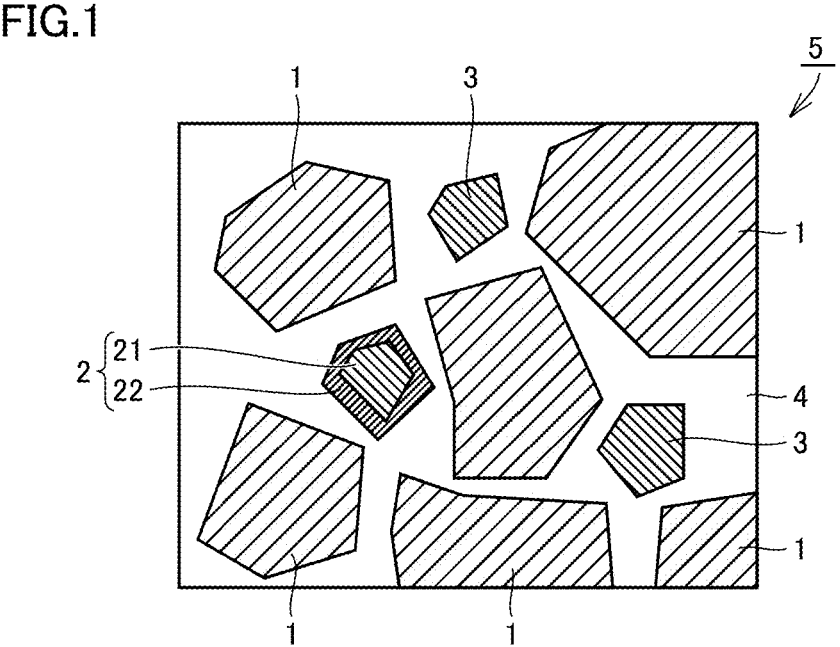
FIG. 1 is a schematic view schematically showing one cross section of a cemented carbide according to the present embodiment.

[Problems to Be Solved By the Present Disclosure]

In the hard material of Patent Literature 1, the composite carbonitride has a core represented by $(Ti_{1-x-y}L_xMo_y)(C_{1-z}N_z)$. In this chemical formula, L is at least one element selected from a group consisting of Zr, Hf, Nb, and Ta, x is more than or equal to 0.01 and less than or equal to 0.5, y is more than or equal to 0.03 and less than or equal to 0.05, and z is more than or equal to 0.05 and less than or equal to 0.75. Therefore, in the composite carbonitride, an atomic ratio of Mo in all the metallic elements (Ti, L, and Mo) is more than or equal to 0.03. However, Mo serves to deteriorate a reaction resistance (hereinafter, also referred to as "welding resistance") of the carbonitride against steel. Hence, a small content of Mo is preferable.

Patent Literature 2 discloses that the second hard phase mainly composed of the composite carbonitride including Ti and W is dispersed uniformly in the whole of the cemented carbide by decreasing a distance ($\sigma^2$) between the respective centers of gravity of two grains closest to each other, thereby improving breakage resistance. However, Patent Literature 2 does not state the reaction resistance of the cemented carbide against steel. Thus, no hard material having an excellent reaction resistance against steel has been obtained yet. Development of such a hard material has been desired.

In view of the above-described actual circumstance, the present disclosure has an object to provide: a cemented carbide having an excellent breakage resistance and an excellent reaction resistance against steel; and a cutting tool including the cemented carbide.

[Advantageous Effect of the Present Disclosure]

According to the present disclosure, there can be provided: a cemented carbide having an excellent breakage resistance and an excellent reaction resistance against steel; and a cutting tool including the cemented carbide.

[Description of Embodiments]

First, embodiments of the present disclosure are listed and described.

(1) A cemented carbide of the present disclosure includes first hard phase grains, second hard phase grains, third hard phase grains, and a metal binder phase, wherein each of the first hard phase grains includes tungsten carbide, each of the second hard phase grains has a core portion in a form of a grain and a peripheral portion that coats at least a portion of the core portion, the core portion is composed of a first composite carbonitride represented by $Ti_{1-X-Z}Nb_XM_ZC_{1-Y}N_Y$, the peripheral portion is composed of a second composite carbonitride, the second composite carbonitride being a carbonitride that has a composition different from a composition of the core portion and that at least includes titanium, niobium, and tungsten, the M represents at least one element selected from a group consisting of vanadium, chromium, and molybdenum, the X is more than or equal to 0.1 and less than or equal to 0.2, the Y is more than or equal to 0.3 and less than or equal to 0.6, the Z is more than or equal to 0 and less than or equal to 0.02, each of the third hard phase grains is composed of the first composite carbonitride, the metal binder phase includes an iron group element, the cemented carbide has a total of 70 unit regions, the total of 70 unit regions are provided by continuously arranging 7 unit regions in a longitudinal direction and 10 unit regions in a lateral direction in an electron microscope image obtained by imaging an arbitrary cross section of the cemented carbide at a magnification of 1500×, each of the unit regions being constituted of a square having each side of 8 μm, the number of unit regions each having a percentage of less than 0.43% or more than 2.43% is less than or equal to 10 among the total of 70 unit regions, the percentage is a percentage of the total number of the number of the second hard phase grains and the number of the third hard phase grains in each unit region with respect to the total number of the number of the second hard phase grains and the number of the third hard phase grains in the total of 70 unit regions, the number of the second hard phase grains in the unit region is the number of second hard phase grains having core portions each having a grain size of more than or equal to 0.2 μm and less than or equal to 3 μm in the unit region, the number of the third hard phase grains in the unit region is the number of third hard phase grains each having a grain size of more than or equal to 0.5 μm and less than or equal to 2.5 μm in the unit region, and in a total of 10 unit regions existing in a fourth row of the total of 70 unit regions in the longitudinal direction in the cemented carbide, a percentage of the number of the third hard phase grains each having a grain size of more than or equal to 0.5 μm and less than or equal to 2.5 μm with respect to the total number of the number of the second hard phase grains having the core portions each having a grain size of more than or equal to 0.2 μm and less than or equal to 3 μm and the number of the third hard phase grains each having a grain size of more than or equal to 0.5 μm and less than or equal to 2.5 μm is more than or equal to 5% and less than or equal to 15%.

The cemented carbide of the present disclosure can have an excellent breakage resistance and an excellent reaction resistance against steel.

(2) Preferably, an average thickness of the peripheral portions is more than or equal to 10 nm and less than or equal to 100 nm. Accordingly, interface strength between the second hard phase grain and the metal binder phase is suppressed from being decreased, thus resulting in improved mechanical characteristic of the cemented carbide.

(3) Preferably, an average grain size of the core portions is more than or equal to 0.2 μm and less than or equal to 2 μm. Accordingly, the reaction resistance of the cemented carbide against steel is further improved.

(4) Preferably, an average grain size of the third hard phase grains is more than or equal to 0.5 μm and less than or equal to 2.5 μm. Accordingly, the reaction resistance of the cemented carbide against steel is further improved.

(5) Preferably, the cemented carbide includes more than or equal to 2 volume % and less than or equal to 10 volume % of the second hard phase grains. Accordingly, the reaction resistance of the cemented carbide against steel is further improved.

(6) Preferably, the cemented carbide includes more than or equal to 3 volume % and less than or equal to 20 volume % of the third hard phase grains. Accordingly, the reaction resistance of the cemented carbide against steel is further improved.

(7) A cutting tool of the present disclosure includes the above-described cemented carbide. Such a cutting tool can have not only an excellent mechanical strength intrinsic to cemented carbides, but also an excellent reaction resistance against steel.

(8) Preferably, the cutting tool includes: a substrate composed of the cemented carbide; and a coating film that coats the substrate. Such a cutting tool also can have not only an excellent mechanical strength intrinsic to cemented carbides, but also an excellent reaction resistance against steel.

[Details of Embodiments of the Present Disclosure]

The following describes a specific example of an embodiment of the present disclosure (hereinafter, also referred to as "the present embodiment") with reference to figures. The same reference characters indicate the same or equivalent portions in the figures of the present disclosure. Relation of such a dimension as a length, a width, a thickness, or a depth is modified as appropriate for clarity and brevity of the drawings and does not necessarily represent actual dimensional relation.

In the present specification, the expression "A to B" represents a range of lower to upper limits (i.e., more than or equal to A and less than or equal to B). When no unit is indicated for A and a unit is indicated only for B, the unit of A is the same as the unit of B.

When a compound or the like is expressed by a chemical formula in the present specification and an atomic ratio is not particularly limited, it is assumed that all the conventionally known atomic ratios are included. The atomic ratio is not necessarily limited only to one in the stoichiometric range. For example, when "WC" is described, an atomic ratio in the WC is not limited to W:C=1:1, and include all the conventionally known atomic ratios. The same also applies to compounds other than the "WC".

In the present embodiment, a metallic element and a nonmetallic element does not necessarily need to constitute a stoichiometric composition. Examples of the metallic element include titanium (Ti), chromium (Cr), niobium (Nb), tungsten (W), and vanadium (V). Examples of the nonmetallic element include nitrogen (N) and carbon (C).

In the present specification, the term "mechanical strength" means a mechanical strength including various characteristics such as wear resistance, breakage resistance, bending strength, and the like of the cemented carbide.

The present inventors have developed a tungsten-carbide (WC)-containing cemented carbide to which a carbonitride containing Ti and Nb (hereinafter, also referred to as "TiNbMCN", where M represents at least one element selected from a group consisting of vanadium, chromium, and molybdenum) is added as a new source material. It was found out that since TiNbMCN is included, this cemented carbide has a more excellent reaction resistance against steel than that of a conventional Ti-based compound. Furthermore, it was found out that both the reaction resistance against steel and a mechanical strength can be secured by appropriately controlling a compositions of Nb and N in TiNbMCN.

However, TiNbMCN is likely to be aggregated in a cemented carbide. It was newly found out that if particle sizes of TiNbMCN are made small in order to prevent the aggregation, Ti and Nb in TiNbMCN tends to be dissolved in WC crystals in a solid state in a sintering step for producing the cemented carbide.

Based on this finding, as a result of diligent study, the present inventors obtained a cemented carbide having a more improved reaction resistance against steel by dispersing TiNbMCN in a balanced manner in the cemented carbide without TiNbMCN being dissolved in the solid state in the WC crystal. Details of the cemented carbide will be described below.

[First Embodiment: Cemented Carbide]

As shown in FIG. 1, a cemented carbide 5 according to one embodiment of the present disclosure (hereafter, also referred to as "the present embodiment") includes: first hard phase grains 1, second hard phase grains 2, third hard phase grains 3, and a metal binder phase 4, wherein each of first hard phase grains 1 includes tungsten carbide, each of second hard phase grains 2 has a core portion 21 in a form of a grain and a peripheral portion 22 that coats at least a portion of core portion 21, core portion 21 is composed of a first composite carbonitride represented by $Ti_{1-X-Z}Nb_XM_ZC_{1-Y}N_Y$, peripheral portion 22 is composed of a second composite carbonitride, the second composite carbonitride being a carbonitride that has a composition different from a composition of the core portion and that at least includes titanium, niobium, and tungsten, the M represents at least one element selected from a group consisting of vanadium, chromium, and molybdenum, the X is more than or equal to 0.1 and less than or equal to 0.2, the Y is more than or equal to 0.3 and less than or equal to 0.6, the Z is more than or equal to 0 and less than or equal to 0.02, each of third hard phase grains 3 is composed of the first composite carbonitride, metal binder phase 4 includes an iron group element, cemented carbide 5 has a total of 70 unit regions R, the total of 70 unit regions R are provided by continuously arranging 7 unit regions R in a longitudinal direction and 10 unit regions R in a lateral direction in an electron microscope image obtained by imaging an arbitrary cross section of cemented carbide 5 at a magnification of 1500×, each of unit regions R being constituted of a square having each side of 8 μm, the number of unit regions R each having a percentage of less than 0.43% or more than 2.43% is less than or equal to 10 among the total of 70 unit regions R, the percentage is a percentage of the total number of the number of second hard phase grains 2 and the number of third hard phase grains 3 in each unit region R with respect to the total number of the number of second hard phase grains 2 and the number of third hard phase grains 3 in the total of 70 unit regions R, the number of second hard phase grains 2 in unit region R is the number of second hard phase grains 2 having core portions 21 each having a grain size of more than or equal to 0.2 μm and less than or equal to 3 μm in unit region R, the number of third hard phase grains 3 in unit region R is the number of third hard phase grains 3 each having a grain size of more than or equal to 0.5 μm and less than or equal to 2.5 μm in unit region R, and in a total of 10 unit regions R existing in a fourth row of the total of 70 unit regions R in the longitudinal direction in cemented carbide 5, a percentage of the number of third hard phase grains 3 each having a grain size of more than or equal to 0.5 μm and less than or equal to 2.5 μm with respect to the total number of the number of second hard phase grains 2 having core portions 21 each having a grain size of more than or equal to 0.2 μm and less than or equal to 3 μm and the number of third hard phase grains 3 each having a grain size of more than or equal to 0.5 μm and less than or equal to 2.5 μm is more than or equal to 5% and less than or equal to 15%.

The cemented carbide having such a feature can have an excellent breakage resistance and an excellent reaction resistance against steel.

<First Hard Phase Grains>

(Composition of Each of First Hard Phase Grains)

Each of first hard phase grains 1 includes tungsten carbide (WC). Preferably, first hard phase grain 1 is mainly composed of WC (tungsten carbide). In addition to WC, first hard phase grain 1 can include: an inevitable element introduced during a production process for WC; a small amount of impurity element; and the like. In order to exhibit the effect of the present disclosure, the content of WC in first hard phase grain 1 is preferably more than or equal to 99 mass %, and is more preferably substantially 100 mass %. Examples of elements that can be included in first hard phase grain 1 in addition to W and C include molybdenum (Mo), chromium (Cr), and the like.

(Volume Ratio of First Hard Phase Grains)

In cemented carbide 5, the volume ratio of first hard phase grains 1 is preferably 65 to 95 volume %. When the volume ratio of first hard phase grains 1 in the cemented carbide is more than or equal to 65 volume %, mechanical strength is improved. When the volume ratio of first hard phase grains 1 in the cemented carbide is less than or equal to 95 volume %, toughness is improved. A preferable volume ratio of first hard phase grains 1 in the cemented carbide is 75 to 85 volume %.

The volume ratio (volume %) of first hard phase grains 1 in cemented carbide 5 can be calculated using the following measurement method. The cemented carbide is subjected to a CP (Cross Section Polisher) process using an argon ion beam or the like, thereby obtaining a sample having a smooth cross section. The cross section of this sample is imaged at 5000× using a field emission scanning electron microscope (FE-SEM; trademark: "JSM-7000F" provided by JEOL), thereby obtaining an electron microscope image (SEM-BSE image) of the cross section of the sample. Moreover, outer edges of first hard phase grains 1 in this electron microscope image are specified.

Next, based on a binarization process using image analysis software (trademark: "Mac-View" provided by MOUN-TECH), the area ratio (area %) of the total (total area) of areas of all the first hard phase grains 1 in the electron microscope image with respect to the total area of the above-described cross section is calculated. Details of the binarization process are as follows. In the electron microscope image, a continuous tone (gray scale: black to gray to white) is caused due to a difference in types of hard phase grains, and the tone is separated (=binarized) into two tones of white and black. A threshold value is set such that only pixels corresponding to the first hard phase grains that can be discriminated in the electron microscope image are indicated by white, and pixels each having a value of less than the threshold value are indicated by black. For conditions for setting the threshold value, the "Otsu's discriminant analysis method", which is one of well-known automatic threshold value determination methods, is applied. A specific manner of the "Otsu's discriminant analysis method" is described in Shigehiko Tanaka et al., "Otsu's Discriminant Analysis Method with Gray Level Co-Occurrence Histogram", "Meeting on Image Recognition and Understanding (MIRU2011)", Japan, "Meeting on Image Recognition and Understanding (MIRU), July, 2011, IS1-3: 93 to 96.

It is assumed that the area ratio (area %) of the total (total area) of the areas of all the first hard phase grains 1 in the above-described electron microscope image with respect to the total area of the above-described cross section corresponds to the volume ratio (volume %) of first hard phase grains 1 in the cemented carbide. In the cross section of the above-described sample, five electron microscope images (five visual fields) are prepared while avoiding overlapped imaged portions, and the volume ratio (volume %) of first hard phase grains 1 is calculated in each of these five visual fields. The average value of the volume ratios (volume %) of first hard phase grains 1 in the five visual fields is regarded as the volume ratio (volume %) of first hard phase grains 1 in the cemented carbide in the present embodiment.

The present inventors set a threshold value in each of a plurality of samples of the cemented carbide of the present embodiment in accordance with the "Otsu's discriminant analysis method", and the threshold value was about 170. The threshold value is a value for the sake of reference because the threshold value is a value influenced by contrast or the like of the image. It should be noted that it has been confirmed that a result of measurement is hardly affected by employing a value slightly higher or lower than 170 as the threshold value.

It should be noted that in the measurement performed by the Applicant, as long as the measurement of the volume ratio (volume %) of the first hard phase grains is performed in the same sample, results of measurement were not substantially varied even when measurement visual fields to be selected were changed and the measurement was performed multiple times. It was confirmed that the results of measurement are not intentional even when a measurement visual field is set arbitrarily.

<Second Hard Phase Grains>

(Configuration of Each of Second Hard Phase Grains)

Each of second hard phase grains 2 includes a core portion 21 in a form of a grain and a peripheral portion 22 that coats at least a portion of core portion 21.

(Volume Ratio of Second Hard Phase Grains)

In cemented carbide 5, the volume ratio of second hard phase grains 2 is preferably more than or equal to 2 volume % and less than or equal to 10 volume %. When the volume ratio of second hard phase grains 2 in the cemented carbide is more than or equal to 2 volume %, the reaction resistance against steel is improved. When the volume ratio of second hard phase grains 2 in the cemented carbide is less than or equal to 10 volume %, the mechanical strength is improved. The lower limit of the volume ratio of second hard phase grains 2 in the cemented carbide can be more than or equal to 2 volume %, more than or equal to 4 volume %, or more than or equal to 5 volume %. The upper limit of the volume ratio of second hard phase grains 2 in the cemented carbide can be less than or equal to 10 volume % or less than or equal to 7 volume %.

The volume ratio (volume %) of the second hard phase grains in the cemented carbide can be calculated by specifying the second hard phase grains instead of the first hard phase grains in the method of measuring the volume ratio of the first hard phase grains. A specific manner of measuring the volume ratio of the second hard phase grains is the same as the manner of measuring the volume ratio of the first hard phase grains, and is therefore not described repeatedly.

(Composition of Each of Core Portions)

Core portion 21 is composed of a first composite carbonitride represented by $Ti_{1-X-Z}Nb_XM_ZC_{1-Y}N_Y$, the M represents at least one element selected from a group consisting of vanadium (V), chromium (Cr), and molybdenum (Mo), the X is more than or equal to 0.1 and less than or equal to 0.2, the Y is more than or equal to 0.3 and less than or equal to 0.6, and the Z is more than or equal to 0 and less than or equal to 0.02. When the composition (Ti, Nb, C, and N) of core portion 21 in the form of a grain in each of second hard phase grains 2 has an atomic ratio falling within the above-described range, the cemented carbide can have an excellent breakage resistance and an excellent reaction resistance against steel.

In core portion 21, Ti is a main component and Nb is a sub component. The M is at least one element selected from a group consisting of V, Cr, and Mo. In order that an amount of addition of the sub component is less than or equal to a solid solubility limit and effects of Ti and Nb, which are added metallic elements, are sufficiently exhibited, the atomic ratio (1-X-Z) of Ti is more than or equal to 0.8 and less than or equal to 0.9. In order to obtain an excellent reaction resistance against steel, Y representing the atomic ratio of nitrogen (N) in the first composite carbonitride is more than or equal to 0.3 and less than or equal to 0.6. The composition of core portion 21 should not be limited in particular as long as the effect of the present disclosure is exhibited, the atomic ratios (X, Y, Z) fall within the above-described ranges, and the composition of core portion 21 is different from the composition of peripheral portion 22. Examples of the composition of core portion 21 include $Ti_{0.85}Nb_{0.15}C_{0.5}N_{0.5}$, $Ti_{0.8}Nb_{0.2}C_{0.45}N_{0.55}$, and the like.

Here, in the first composite carbonitride of core portion 21 represented by $Ti_{1-X-Z}Nb_XM_ZC_{1-Y}N_Y$, X is preferably more than or equal to 0.12 and less than or equal to 0.18. Further, X is more preferably more than or equal to 0.14 and less than or equal to 0.16. Y is preferably more than or equal to 0.4 and less than or equal to 0.55. Accordingly, an excellent reaction resistance against steel is obtained while preferable characteristics can be obtained in terms of a mechanical strength such as wear resistance and breakage resistance.

In the first composite carbonitride represented by $Ti_{1-X-Z}Nb_XM_ZC_{1-Y}N_Y$, the M is at least one element selected from a group consisting of V, Cr, and Mo. Therefore, core portion 21 may include at least one element selected from the group consisting of V, Cr, and Mo. In this case, the Z is more than or equal to 0 and less than or equal to 0.02, i.e., the total amount of V, Cr, and Mo is less than 2 atom % with respect to the whole amount of Ti, Nb, V, Cr, and Mo. This makes it possible to sufficiently suppress V, Cr, and Mo, which are elements that adversely affect the reaction resistance of the cemented carbide against steel.

The composition and atomic ratio of the first composite carbonitride included in core portion 21 are calculated using the following measurement method. An electron microscope image (SEM-BSE image) of a cross section of the sample is obtained in the same manner as in the case of calculating the volume ratio of the first hard phase grains. The composition and atomic ratio of the first composite carbonitride included in core portion 21 can be identified by analyzing, using an energy dispersive X-ray spectrometer (EDX) in the field emission scanning electron microscope (FE-SEM) or an electron probe microanalyzer (EPMA), core portion 21 included in second hard phase grain 2 appearing in the electron microscope image. Each of the composition of the first hard phase grain, the composition of the below-described peripheral portion of the second hard phase grain, the composition of the third hard phase grain, and the composition of the iron group element in the metal binder phase can be also identified in the same manner by performing measurement with respect to a corresponding one of first hard phase grain 1, the peripheral portion of the second hard phase grain, and the metal binder phase, each of which appears in the above-described electron microscope image.

(Average Grain Size of Core Portions)

The average grain size of the core portions is preferably more than or equal to 0.2 μm and less than or equal to 2 μm. Accordingly, the reaction resistance of the cemented carbide against steel is further improved. The average grain size of the core portions is more preferably more than or equal to 0.6 μm and less than or equal to 1.6 μm, and is further preferably more than or equal to 0.8 μm and less than or equal to 1.4 μm. When the average grain size of the core portions is more than or equal to 0.2 μm, the reaction resistance against steel is further improved. When the average grain size of the core portions is less than or equal to 2 μm, the mechanical strength is improved.

In order to calculate the average grain size of the core portions, the grain size of each core portion can be calculated using the following method. An electron microscope image (SEM-BSE image) of a cross section of the sample is obtained in the same manner as in the case of calculating the volume ratio of the first hard phase grains. The core portion is specified by performing a binarization process to the above-described electron microscope image using the image analysis software utilized to measure the volume ratio of the first hard phase grains. In the binarization process, a threshold value is set such that only pixels corresponding to the core portions that can be discriminated by visual observation in the electron microscope image are indicated by white, and pixels each having a value of less than the threshold value are indicated by black. Further, the diameter (equivalent circle diameter) of a circle having an area equal to that of the core portion is calculated, and this equivalent circle diameter is regarded as the grain size of the core portion. The average grain size of the core portions is the average value of calculated equivalent circle diameters of all the core portions appearing in the above-described electron microscope image.

In the description above, the core portions are discriminated by visual observation on the electron microscope image. It has been confirmed that the same result was obtained when the core portions were discriminated by visual observations by multiple observers on the same electron microscope image. Therefore, even when the core portions are discriminated by visual observations on the electron microscope image, results are not varied depending on the observers.

The present inventors set a threshold value in each of a plurality of samples of the cemented carbide of the present embodiment in accordance with the above-described method, and the threshold value was about 65. The threshold value is a value for the sake of reference because the threshold value is a value influenced by contrast or the like of the image. It should be noted that it has been confirmed that a result of measurement is hardly affected by employing a value slightly higher or lower than 65 as the threshold value.

It should be noted that in the measurement performed by the Applicant, as long as the measurement of the average grain size of the core portions is performed in the same sample, results of measurement were not substantially varied even when measurement visual fields to be selected were changed and the measurement was performed multiple times. It was confirmed that the results of measurement are not intentional even when a measurement visual field is set arbitrarily.

In the description below, the term "grain size" in the present specification refers to the "equivalent circle diameter" measured by the same method as the above-described method.

(Peripheral Portion)

Second hard phase grain 2 includes peripheral portion 22 that coats at least a portion of core portion 21. The peripheral portion is composed of a second composite carbonitride, the second composite carbonitride being a carbonitride that has a composition different from a composition of core portion 21 and that at least includes titanium, niobium, and tungsten.

Peripheral portion 22 is formed in a below-described sintering step (fourth step) of sintering the cemented carbide. During liquid phase sintering, particles of the first composite carbonitride and surrounding WC particles are dissolved with each other in the solid state and are dissolved and re-precipitated, with the result that peripheral portion 22 is formed around core portion 21 as a composition that is richer in W and C than the composition of the first composite carbonitride ($Ti_{1-X-Z}Nb_XM_ZC_{1-Y}N_Y$) of core portion 21. Hence, peripheral portion 22 coats at least a portion of core portion 21 and has a composition different from that of core portion 21.

Peripheral portion 22 functions as an adhesion layer for increasing an adhesion strength between second hard phase grain 2 and metal binder phase 4. Accordingly, an interface strength between second hard phase grain 2 and metal binder phase 4 can be suppressed from being decreased, whereby the mechanical characteristic of the cemented carbide can be improved. Peripheral portion 22 may coat part or whole of core portion 21 as long as the effect of the present disclosure is exhibited. The composition of peripheral portion 22 should not be limited particularly as long as the effect of the present disclosure is exhibited and the composition of peripheral portion 22 is different from the composition of core portion 21, and examples of the composition of peripheral portion 22 can include $Ti_{1-a-c}Nb_aW_cC_{1-b}N_b$ (a is more than or equal to 0.05 and less than or equal to 0.15, b is more than or equal to 0.2 and less than or equal to 0.5, and c is more than or equal to 0 and less than or equal to 5).

The average thickness of peripheral portions 22 is preferably more than or equal to 10 nm and less than or equal to 100 nm. Accordingly, an interface strength between the second hard phase grain and the metal binder phase is suppressed from being decreased, thus resulting in improved mechanical characteristic of the cemented carbide. The lower limit of the average thickness of the peripheral portions is preferably more than or equal to 15 nm, is more preferably more than or equal to 20 nm, and is further preferably more than or equal to 30 nm. The upper limit of the average thickness of the peripheral portions is preferably less than or equal to 90 nm, is more preferably less than or equal to 80 nm, and is further preferably less than or equal to 70 nm.

In order to calculate the average thickness of the peripheral portions, the thickness of each peripheral portion can be measured using the following method. An electron microscope image (SEM-BSE image) of a cross section of the sample is obtained in the same manner as in the case of calculating the volume ratio of the first hard phase grains. The thicknesses of each peripheral portion at any three positions are measured in the above-described electron microscope image using the image analysis software utilized to measure the volume ratio of the first hard phase grains, and the average value of these thicknesses is regarded as the thickness of the peripheral portion. It should be noted that when the peripheral portion does not coat the whole of the core portion, the thicknesses of the peripheral portion at any three positions within a region in which the peripheral portion exists are measured, and the average value of these thicknesses is regarded as the thickness of the peripheral portion. The average thickness of the peripheral portions is the average value of the calculated thicknesses of all the peripheral portions appearing in the above-described electron microscope image.

It should be noted that in the measurement performed by the Applicant, as long as the measurement is performed in the same sample, results of measurement were not substantially varied even when measurement visual fields to be selected were changed and the measurement was performed multiple times. It was confirmed that the results of measurement are not intentional even when a measurement visual field is set arbitrarily.

<Third Hard Phase Grains>

(Composition of Each of Third Hard Phase Grains)

Each of the third hard phase grains is composed of the first composite carbonitride represented by $Ti_{1-X-Z}Nb_XM_ZC_{1-Y}N_Y$. That is, the composition of the third hard phase grain is represented by the same composition formula as that for the core portion of the second hard phase grain and the respective ranges of X, Y, and Z can also be the same as those therein, and therefore description thereof is not provided repeatedly.

It should be noted that the values of X, Y, and Z may be the same or different between the third hard phase grain and the core portion of the second hard phase grain as long as the values of X, Y, and Z fall within the above-described respective ranges.

(Volume Ratio of Third Hard Phase Grains)

In cemented carbide 5, the volume ratio of third hard phase grains 3 is preferably more than or equal to 3 volume % and less than or equal to 20 volume %. When the content of second hard phase grains 2 in the cemented carbide is more than or equal to 3 volume %, the reaction resistance against steel is improved. When the content of third hard phase grains 3 in the cemented carbide is less than or equal to 20 volume %, the mechanical strength is improved. A preferable content of third hard phase grains 3 in the cemented carbide is more than or equal to 5 volume % and less than or equal to 15 volume %.

The volume ratio (volume %) of the third hard phase grains can be calculated by specifying the third hard phase grains instead of the first hard phase grains in the method of measuring the volume ratio of the first hard phase grains. A specific manner of measuring the volume ratio of the third hard phase grains is the same as the manner of measuring the volume ratio of the first hard phase grains, and is therefore not described repeatedly.

(Average Grain Size of Third Hard Phase Grains)

The average grain size of third hard phase grains 3 is preferably more than or equal to 0.5 μm and less than or equal to 2.5 μm. Accordingly, the reaction resistance of the cemented carbide against steel is further improved. The average grain size of third hard phase grains 3 is more preferably more than or equal to 0.8 μm and less than or equal to 2.3 μm, and is further preferably more than or equal to 1.0 μm and less than or equal to 2.0 μm. When the average grain size of third hard phase grains 3 is more than or equal to 1.2 μm, the reaction resistance against steel is further improved. When the average grain size of third hard phase grains 3 is less than or equal to 1.5 μm, the mechanical strength is further improved.

The average grain size of the third hard phase grains is obtained in the following manner: in the method of measuring the average grain size of the second hard phase grains, the third hard phase grains are specified instead of the core portions, the equivalent circle diameters thereof are calculated, and the average grain size is calculated based on them. A specific manner of measuring the average grain size of the third hard phase grains is the same as the manner of measuring the average grain size of the second hard phase grains, and is therefore not described repeatedly.

<Metal Binder Phase>

Metal binder phase 4 includes an iron group element. That is, metal binder phase 4 is mainly composed of an iron group element. In addition to the iron group element, metal binder phase 4 can include: an inevitable element introduced from first hard phase grain 1, second hard phase grain 2, and third hard phase grain 3; a small amount of impurity element; or the like. In order to maintain metal binder phase 4 to be in a state of metal and avoid formation of a brittle intermediate compound, the content of the iron group element in metal binder phase 4 is preferably more than or equal to 90 atom % and is more preferably more than or equal to 95 atom %. The upper limit of the content of the iron group element in metal binder phase 4 is 100 atom %. Here, the iron group element refers to a group 8 element, a group 9 element, and a group 10 element in the fourth period, i.e., iron (Fe), cobalt (Co), and nickel (Ni). Examples of the element other than the iron group element and contained in metal binder phase 4 include titanium (Ti), tungsten (W), and the like.

Metal binder phase 4 is preferably mainly composed of Co. The content of the iron group element other than Co in metal binder phase 4 is preferably less than 1 volume % and is more preferably less than 0.5 volume %.

The content of metal binder phase 4 in the cemented carbide is preferably 7 to 15 volume %. When the content of metal binder phase 4 in the cemented carbide is more than or equal to 7 volume %, sufficient adhesion strength is obtained and toughness is improved. When the content of metal binder phase 4 in the cemented carbide is less than or equal to 15 volume %, the hardness is improved. A more preferable content of metal binder phase 4 in the cemented carbide is 9 to 13 volume %. The content (volume %) of metal binder phase 4 can be calculated by the same method as the method of measuring the content of first hard phase grains 1.

Further, the total of the respective contents of first hard phase grains 1, second hard phase grains 2, and metal binder phase 4 is preferably more than or equal to 95 volume %, is more preferably more than or equal to 98 volume %, and is most preferably 100 volume %. Accordingly, an excellent reaction resistance against steel can be attained with a good yield.

<Degree of Dispersion of Second Hard Phase Grains and Third Hard Phase Grains>

Cemented carbide 5 according to the present embodiment has a total of 70 unit regions R, the total of 70 unit regions R are provided by continuously arranging 7 unit regions R in a longitudinal direction and 10 unit regions R in a lateral direction in an electron microscope image obtained by imaging an arbitrary cross section of cemented carbide 5 at a magnification of 1500×, each of unit regions R being constituted of a square having each side of 8 µm, the number of unit regions R each having a percentage of less than 0.43% or more than 2.43% is less than or equal to 10 among the total of 70 unit regions R, the percentage is a percentage of the total number of the number of second hard phase grains 2 and the number of third hard phase grains 3 in each unit region R with respect to the total number of the number of second hard phase grains 2 and the number of third hard phase grains 3 in the total of 70 unit regions R, the number of second hard phase grains 2 in unit region R is the number of second hard phase grains 2 having core portions each having a grain size of more than or equal to 0.2 µm and less than or equal to 3 µm in unit region R, and the number of third hard phase grains 3 in unit region R is the number of third hard phase grains 3 each having a grain size of more than or equal to 0.5 µm and less than or equal to 2.5 µm in unit region R.

Here, when the number of unit regions R in each of which the above-described percentage is less than 0.43% or more than 2.43% is less than or equal to 10, it can be determined that the second hard phase grains and the third hard phase grains are uniformly dispersed in a balanced manner in the cemented carbide. The present inventors found that the cemented carbide has an excellent reaction resistance against steel in this case. Further, it was also found that when the number of such unit regions is more than or equal to 11, it tends to be difficult for the cemented carbide to have a desired excellent reaction resistance against steel. In the present specification, the term "degree of dispersion of the core portions" may be used in order to indicate whether or not the core portions are dispersed uniformly in the cemented carbide in a balanced manner in accordance with whether the "degree of dispersion of the core portions" is high or low in the cemented carbide.

With reference to FIG. 2 and FIG. 3, the following describes a method (hereinafter, also referred to as "degree-of-dispersion measurement method") of evaluating whether the degree of dispersion of the core portions is high or low in the present embodiment.

By performing a CP process to the cemented carbide using an argon ion beam, a smooth cross section of the cemented carbide is prepared. This cross section is imaged at 1500× using a field emission scanning electron microscope (FE-SEM; trademark: "JSM-7000F" provided by JEOL), thereby obtaining an electron microscope image (SEM-BSE image).

Next, a total of 70 unit regions R are provided by arranging 7 unit regions R in the longitudinal direction and 10 unit regions R in the lateral direction in the electron microscope image as shown in FIG. 2. Each unit region R is sized to be a square having each side of 8 µm.

By performing image analysis using image analysis software (trademark: "Mac-View" provided by MOUNTECH), the number of the second hard phase grains having the core portions each having a grain size of more than or equal to 0.2 µm and less than or equal to 3 µm and the number of the third hard phase grains each having a grain size of more than or equal to 0.5 µm and less than or equal to 2.5 µm in each unit region R are counted. In FIG. 2, the number of the second hard phase grains is indicated on the upper side in each unit region R, whereas the number of the third hard phase grains is indicated on the lower side in each unit region R.

The second hard phase grains and the third hard phase grains can be discriminated from each other in accordance with a difference in contrast of the composition image. Each third hard phase grain is represented by only a black grain and each second hard phase grain is represented by a black grain surrounded by a gray portion. It should be noted that each first hard phase grain is represented by white.

Here, the grain size of the core portion refers to the diameter (equivalent circle diameter) of a circle having an area equal to the area of the core portion. The method of calculating the grain size of the core portion is the same as the above-described method used to calculate the grain size of the core portion, and therefore is not described repeatedly. The grain size of the third hard phase grain refers to the diameter (equivalent circle diameter) of a circle having an area equal to the area of the third hard phase grain. The method of calculating the grain size of the third hard phase grain is the same as the above-described method used to calculate the grain size of the third hard phase grain, and therefore is not described repeatedly.

Then, a total of the numbers of the core portions and the third hard phase grains in the total of 70 unit regions R, and a percentage of the total number of the second hard phase grains and the third hard phase grains in each unit region R with respect to the total of the numbers is calculated as shown in FIG. 3.

Since the total of 70 unit regions R with 7 unit regions R arranged in the longitudinal direction and 10 unit regions R arranged in the lateral direction are provided in the above-described electron microscope image, when the second hard phase grains and the third hard phase grains are uniformly dispersed in a completely balanced manner in the cemented carbide, the total number of the second hard phase grains and the third hard phase grains in each unit region R is indicated in the above-described percentage as follows: 1.43% (1/70×100%). Therefore, when the total number (percentage) of the second hard phase grains and the third hard phase grains counted in unit region R falls within a range of 1.43%±1%, i.e., a range of 0.43 to 2.43%, it is determined that the total number of the second hard phase grains and the third hard phase grains is balanced in unit region R. On the other hand, when the total number (percentage) of the second hard phase grains and the third hard phase grains counted in unit region R falls out of the range of 1.43%±1%, i.e., is less than 0.43% or more than 2.43%, it is determined that the total number of the second hard phase grains and the third hard phase grains is imbalanced in unit region R.

Next, under such a determination, the number of unit regions R in each of which the total number of the second hard phase grains and the third hard phase grains is indicated in the above-described percentage of less than 0.43% or more than 2.43% is calculated (hereinafter, the number of such unit regions R is also referred to as "degree of dispersion of the second hard phase grains and the third hard phase grains"). Thus, as the number of unit regions R in each of which the total number of the second hard phase grains and the third hard phase grains is less than 0.43% or more than 2.43% is smaller, it can be evaluated that the second hard phase grains and the third hard phase grains are more uniformly dispersed in a more balanced manner in the cemented carbide captured in the above-described electron microscope image. In other words, in the cemented carbide in which the number of unit regions R in each of which the total number of the second hard phase grains and the third hard phase grains is less than 0.43% or more than 2.43% is less than or equal to 10 (less than or equal to 15% of the total number of unit regions R), the degree of dispersion of the second hard phase grains and the third hard phase grains is high, thus attaining an excellent reaction resistance against steel. In view of the above, by analyzing whether or not the number of unit regions R in which the above-described percentage is less than 0.43% or more than 2.43% is less than or equal to 10 in the electron microscope image, it is possible to evaluate whether the degree of dispersion of the second hard phase grains and the third hard phase grains in the cemented carbide is high or low.

In FIG. 3, the number of unit regions R in each of which the above-described percentage is less than 0.43% or more than 2.43% is 6 (8.6% of the total number of unit regions R). Hence, the cemented carbide captured in the above-described electron microscope image can be evaluated as having a high degree of dispersion of the second hard phase grains and the third hard phase grains, thus attaining an excellent reaction resistance against steel.

In each of the degree-of-dispersion measurement method and a below-described method of measuring the percentage of the number of the third hard phase grains, the number of second hard phase grains having core portions each having a grain size of more than or equal to 0.2 μm and less than or equal to 3 μm and the number of third hard phase grains each having a grain size of more than or equal to 0.5 μm and less than or equal to 2.5 μm are counted. This is because measurement is performed with respect to only the core portions and the third hard phase grains (first composite carbonitride represented by $Ti_{1-X-Z}Nb_XM_ZC_{1-Y}N_Y$) both not dissolved in the solid state in the tungsten carbide crystal included in the first hard phase grains.

The second hard phase grains having the core portions each having a grain size of less than 0.2 μm and the third hard phase grains each having a grain size of less than 0.5 μm tend to cause aggregation in the cemented carbide, thereby adversely affecting the reaction resistance against steel. The second hard phase grains having the core portions each having a grain size of more than 3 μm and the third hard phase grains each having a grain size of more than 2.5 μm tend to be less likely to finely dispersed in the cemented carbide, thereby adversely affecting the reaction resistance against steel.

In each of the degree-of-dispersion measurement method and the below-described method of measuring the percentage of the number of the third hard phase grains, when a core portion of a second hard phase grain and a third hard phase grain exist to extend over adjacent unit regions R, the second hard phase grain and the third hard phase grain are counted as being included in a unit region R having the smallest number of the second hard phase grains and the third hard phase grains among unit regions R over which the core portion of the second hard phase grain and the third hard phase grain exist to extend.

In the above-described degree-of-dispersion measurement method, five electron microscope images (five visual fields) of one cross section of the cemented carbide are prepared while avoiding overlapped imaged portions. These five visual fields are preferably constituted of: one visual field located at the center portion of the one cross section; and four visual fields located at the upper and lower sides and the right and left sides with respect to the foregoing one visual field. In the above-described degree-of-dispersion measurement method, in each of the above-described five visual fields, the number of unit regions R in which the percentage is less than 0.43% or more than 2.43% is calculated. Only when the number of such unit regions R is less than or equal to 10 in three or more of the five visual fields, it is determined that the number of the unit regions in each of which the percentage is less than 0.43% or more than 2.43% is less than or equal to 10 in the cemented carbide captured in the above-described electron microscope image.

It should be noted that in the measurement performed by the Applicant, as long as the measurement is performed in the same sample, results of measurement were not substantially varied even when measurement visual fields to be selected were changed and the measurement was performed multiple times. It was confirmed that the results of measurement are not intentional even when a measurement visual field is set arbitrarily.

<Percentage of Number of Third Hard Phase Grains>

In a total of 10 unit regions existing in a fourth row of the total of 70 unit regions in the longitudinal direction in the cemented carbide according to the present embodiment, a percentage (hereinafter, also referred to as "percentage of the number of the third hard phase grains") of the number of the third hard phase grains each having a grain size of more than or equal to 0.5 μm and less than or equal to 2.5 μm with respect to the total number of the number of the second hard phase grains having the core portions each having a grain size of more than or equal to 0.2 μm and less than or equal to 3 μm and the number of the third hard phase grains each having a grain size of more than or equal to 0.5 μm and less than or equal to 2.5 μm is more than or equal to 5% and less than or equal to 15%.

Here, when the percentage of the number of the third hard phase grains is more than or equal to 5% and less than or equal to 15%, it can be determined that a sufficient amount of the second hard phase grains each having the peripheral portion exist in the cemented carbide. The present inventors found that the cemented carbide has an excellent breakage resistance in this case. It was also found that when the percentage of the number of the third hard phase grains is less than 5%, a sufficient reaction resistance against steel tends to be unable to be exhibited, and when the percentage of the number of the third hard phase grains is more than 15%, a sufficient breakage resistance tends to be unable to be exhibited.

With reference to FIG. 2 and FIG. 3, the following describes a method of evaluating the percentage of the number of the third hard phase grains in the present embodiment (hereinafter, also referred to as "percentage-of-number measurement method").

An electron microscope image is obtained in the same manner as in the degree-of-dispersion measurement method and a total of 70 unit regions R are set as shown in FIG. 2. Calculation is performed to find the ratio of the number of the third hard phase grains each having a grain size of more than or equal to 0.5 μm and less than or equal to 2.5 μm with respect to the total number of the number of the second hard phase grains having the core portions each having a grain size of more than or equal to 0.2 μm and less than or equal to 3 μm and the number of the third hard phase grains each having a grain size of more than or equal to 0.5 μm and less than or equal to 2.5 μm in a total of 10 unit regions (10 unit regions having hatched backgrounds in FIG. 2) existing in the fourth row of the total of 70 unit regions in the longitudinal direction.

In FIG. 2, in the total of 10 unit regions, the total number of the second hard phase grains and the third hard phase grains is 97 and the number of the third hard phase grains is 10. Therefore, the percentage of the number of the third hard phase grains is 10.3%. Hence, it can be determined that a sufficient amount of the second hard phase grains each having the peripheral portion exist in the cemented carbide captured in the above-described electron microscope image, with the result that the cemented carbide can have an excellent breakage resistance.

As with the above-described degree-of-dispersion measurement method, the percentage-of-number measurement method is performed onto the electron microscope images of the five visual fields. Only when the percentage of the number of the third hard phase grains is more than or equal to 5% and less than or equal to 15% in three or more visual fields of the five visual fields, it is determined that the percentage of the number of the third hard phase grains is more than or equal to 5% and less than or equal to 15% in the cemented carbide captured in the above-described electron microscope image.

It should be noted that in the measurement performed by the Applicant, as long as the measurement is performed in the same sample, results of measurement were not substantially varied even when measurement visual fields to be selected were changed and the measurement was performed multiple times. It was confirmed that the results of measurement are not intentional even when a measurement visual field is set arbitrarily.

[Second Embodiment: Method of Producing Cemented Carbide]

The cemented carbide according to the first embodiment can be produced by the following method. That is, the method of producing the cemented carbide includes: a step (first step) of obtaining a powder of a first composite carbonitride represented by $Ti_{1-X-Z}Nb_XM_ZC_{1-Y}N_Y$; a step (second step) of obtaining a powder mixture by using a ball mill to mix the powder of the first composite carbonitride, a WC powder, and an iron group element powder for more than 15 hours and less than or equal to 20 hours; a step (third step) of obtaining a molded body by performing pressure molding to the powder mixture; and a step (fourth step) of obtaining a sintered material by sintering the molded body. In the $Ti_{1-X-Z}Nb_XM_ZC_{1-Y}N_Y$, the M is at least one impurity element selected from a group consisting of V, Cr, and Mo, the X is more than or equal to 0.1 and less than or equal to 0.2, the Y is more than or equal to 0.3 and less than or equal to 0.6, and the Z is more than or equal to 0 and less than or equal to 0.02. According to such a production method, it is possible to produce a cemented carbide having an excellent reaction resistance against steel.

<First Step>

The first step is a step of obtaining a powder of the first composite carbonitride represented by $Ti_{1-X-Z}Nb_XM_ZC_{1-Y}N_Y$. The first step further includes the following steps. That is, the first step, i.e., the step of obtaining the powder of the first composite carbonitride includes: a step (mixing step) of obtaining a third powder by mixing a first powder including Ti and Nb and a second powder at least including graphite; a step (granulation step) of obtaining a granulated body by granulating the third powder; a step (thermal treatment step) of obtaining a powder precursor composed of the first composite carbonitride by thermally treating the granulated body at more than or equal to 1800° C. under an atmosphere including nitrogen gas; and a step (pulverization step) of obtaining the powder of the first composite carbonitride by pulverizing the powder precursor.

(Mixing Step)

In the mixing step, the third powder is obtained by mixing the first powder including Ti and Nb and the second powder at least including graphite.

The first powder includes Ti and Nb. The first powder is preferably an oxide containing Ti and Nb. When the first powder is an oxide, the primary particle size of a first composite carbonitride powder to be obtained by the below-described pulverization step can be readily fine, whereby the average particle size can be 0.2 to 2 for example. Further, the first powder may include one or more impurity elements selected from a group consisting of V, Cr, and Mo as a component introduced from a facility used for the production or the like. In this case, in the first powder, the total amount of V, Cr, and Mo is preferably less than 2 atom % with respect to the whole amount of Ti, Nb, V, Cr, and Mo. Specific examples of the first powder include a complex oxide such as $Ti_{0.9}Nb_{0.1}O_2$. The first powder may be a powder mixture containing an oxide powder such as $TiO_2$ or $Nb_2O_5$. The oxidation number of each element, the content of the impurity element, and the like can be changed unless contrary to the object.

The second powder at least includes graphite. In the mixing step, the third powder is obtained by mixing this second powder and the above-described first powder. This makes it possible to simultaneously and continuously perform the following reactions in the below-described thermal treatment step: a reduction reaction of the above-described oxide; a solid solution reaction due to Ti and Nb being diffused to each other in the reduced oxide; and a carbon nitriding reaction of Ti and Nb dissolved in the solid state. As a result, the composite carbonitride can be obtained efficiently.

For a method of mixing the first powder and the second powder, a conventionally known method can be used. However, in order to attain a small average particle size of the third powder, a mixing method employing a dry type ball mill allowing for a high pulverization action, or a mixing method employing a wet type ball mill can be used suitably. Further, it is possible to use a mixing method employing a rotary blade type fluid mixer allowing for a low pulverization action or the like. The average particle size of the third powder can be calculated based on all the particles of the third powder appearing in an observation image observed using a SEM (scanning electron microscope) at a magnification of 10000×. The equivalent circle diameters of all the particles of the third powder appearing in the observation image are calculated using the above-described image analysis software, and the average value of the equivalent circle diameters thereof can be regarded as the average particle size of the third powder. A mixture ratio (volume ratio) of the first powder and the second powder is preferably as follows: when a ratio of the first powder is 1, a ratio of the second powder is 0.3 to 0.4.

(Granulation Step)

In the granulation step, the granulated body is obtained by granulating the above-described third powder. For a granulation method in the granulation step, a conventionally known granulation method can be used. Examples thereof include a method employing a known apparatus such as a spray dryer or an extrusion granulating machine. Further, for granulation, a binder component such as wax can be appropriately used as a binder, for example. The shape and dimension of the granulated body should not be limited particularly. For example, the granulated body can have a cylindrical shape having a diameter of 0.5 to 5 mm and a length of 5 to 20 mm.

(Thermal Treatment Step)

In the thermal treatment step, a powder precursor composed of the first composite carbonitride is obtained by thermally treating the granulated body at more than or equal to 1800° C. under an atmosphere including nitrogen gas. In the thermal treatment step, under the atmosphere including nitrogen gas, oxygen in the oxide in the first powder included in the above-described granulated body reacts with graphite in the second powder, thereby reducing Ti and Nb in the first powder. Further, the reduced Ti and Nb are diffused to each other and accordingly undergo a solid solution reaction. At the same time, the reduced Ti and Nb undergo a carbon nitriding reaction in which the reduced Ti and Nb reacts with nitrogen in the atmosphere and graphite in the second powder. Accordingly, the powder precursor composed of the first composite carbonitride represented by $Ti_{1-X-Z}Nb_XM_ZC_{1-Y}N_Y$ as described above is formed.

Here, in the thermal treatment step, the powder precursor composed of the above-described first composite carbonitride is not obtained when a metal powder including Ti and Nb or a powder including a carbonitride of Ti and a carbonitride of Nb is mixed with the second powder instead of the first powder and the resulting powder mixture is thermally treated under the above-described conditions. This is due to the following reason: since a carbon nitriding reaction is progressed promptly in the metal powder including Ti and Nb by the thermal treatment, the solid solution reaction due to Ti and Nb being diffused to each other is not progressed. Another reason thereof is as follows: since the powder including the carbonitride of Ti and the carbonitride of Nb is chemically stable even in a high temperature region of more than 2000° C., the solid solution reaction due to Ti and Nb being diffused to each other is not progressed.

The atmosphere of the thermal treatment in the thermal treatment step should not be limited particularly as long as the atmosphere includes nitrogen gas. The atmosphere of the thermal treatment may be pure $N_2$ gas, or a mixed gas in which $N_2$ gas is mixed with hydrogen gas ($H_2$ gas), argon gas (Ar gas), helium gas (He gas), carbon monoxide gas (CO gas), or the like.

The temperature of the thermal treatment in the thermal treatment step is more than or equal to 1800° C. and is preferably more than or equal to 2000° C. in order to progress and promote the reduction reaction, solid solution reaction, and carbon nitriding reaction of the first powder. However, in order to prevent excessive aggregation of the powder precursor obtained by the thermal treatment, the temperature of the thermal treatment is preferably less than or equal to 2400° C.

A time for the thermal treatment in the thermal treatment step is preferably adjusted in accordance with the average particle size of the third powder. For example, when the average particle size of the third powder with which the first powder and the second powder are mixed is 0.3 to 0.5 µm, the time for the thermal treatment is suitably 15 to 60 minutes. It is preferable that as the value of the average particle size of the third powder is smaller, the time for the thermal treatment in the thermal treatment step is shorter, and that as the value of the average particle size of the third powder is larger, the time for the thermal treatment in the thermal treatment step is longer.

In the thermal treatment step, it is preferable to use a rotary type continuous thermal treatment apparatus such as a rotary kiln. This thermal treatment apparatus includes an inclined rotary type reaction tube. Further, the thermal treatment apparatus includes: a heating mechanism for heating the rotary type reaction tube; a gas inlet for introducing gas including nitrogen to the rotary type reaction tube; a gas outlet for discharging the gas including nitrogen from the rotary type reaction tube; an introduction port for introducing the granulated body into the rotary type reaction tube; a removal port for removing the powder precursor from the rotary type reaction tube;

and the like. Such a thermal treatment apparatus is preferable because the thermal treatment apparatus can thermally treat the granulated body under constant conditions and therefore can efficiently and continuously produce the powder precursor of the composite carbonitride with stable quality.

In the thermal treatment step, when the above-described thermal treatment apparatus is used, the rotary type reaction tube is first heated at more than or equal to 1800° C. using the heating mechanism and a nitrogen atmosphere is attained in the rotary type reaction tube by introducing gas including nitrogen gas from the gas inlet. Further, the granulated body is thermally treated by continuously supplying the granulated body from the introduction port located at an upper portion of the rotary type reaction tube and by rotating the rotary type reaction tube to move the granulated body in the rotary type reaction tube. Accordingly, the powder precursor composed of the first composite carbonitride powder can be formed. This powder precursor can be removed from the removal port located at a lower portion of the rotary type reaction tube.

(Pulverization Step)

In the pulverization step, a powder of the above-described first composite carbonitride is obtained by pulverizing the powder precursor obtained as described above. For a method of pulverizing the powder precursor, a conventionally known pulverization method can be used. Accordingly, the powder of the composite carbonitride represented by $Ti_{1-X-Z}Nb_XM_ZC_{1-Y}N_Y$ can be obtained. In the $Ti_{1-X-Z}Nb_XM_ZC_{1-Y}N_Y$, the M is at least one impurity element selected from a group consisting of V, Cr, and Mo, the X is more than or equal to 0.1 and less than or equal to 0.2, the Y is more than or equal to 0.3 and less than or equal to 0.6, and the Z is more than or equal to 0 and less than or equal to 0.02.

<Second Step>

The second step is a step of obtaining a powder mixture by using a ball mill to mix the powder of the first composite carbonitride, WC powder, and iron group element powder for more than 15 hours and less than or equal to 20 hours. These powders can be obtained by using a conventionally known mixing method employing a ball mill. For example, it is preferable to use: a mixing method employing a dry type ball mill allowing for a high pulverization action; or a mixing method employing a wet type ball mill. A time for mixing using this ball mill is more than 15 hours and less than or equal to 20 hours. The time for mixing using the ball mill is preferably more than or equal to 16 hours and less than or equal to 18 hours. Accordingly, in the cemented carbide to be produced through the below-described sintering step (fourth step), the degree of dispersion of the first composite carbonitride (core portions) can be increased.

When the time for mixing using the ball mill is less than or equal to 15 hours, the mixing may be insufficient, with the result that the degree of dispersion of the first composite carbonitride (core portions) may not be increased sufficiently in the cemented carbide to be produced through the sintering step (fourth step). When the time for mixing using the ball mill is more than 20 hours, the mixing may be excessive, with the result that a desired mechanical strength, particularly, a desired toughness may not be obtained in the cemented carbide to be produced through the sintering step (fourth step).

<Third Step>

The third step is a step of obtaining a molded body by performing pressure molding to the powder mixture. For a method of performing pressure molding to the powder mixture, a conventionally known pressure molding method can be used. For example, the powder mixture can be provided in a metal mold, and can be formed into a predetermined shape under a predetermined pressure. Examples of the molding method include a dry type pressure molding method, a cold isostatic pressing method, an injection molding method, an extrusion molding method, and the like. A pressure during the molding is preferably about more than or equal to 0.5 ton weight/cm² (about 50 MPa) and less than or equal to 2.0 ton weight/cm² (about 200 MPa). The shape of the molded body may be determined in accordance with a desired shape of a product. For the shape of the molded body, a shape that is not too complicated is selected.

<Fourth Step>

The fourth step is a step of obtaining a sintered material by sintering the molded body. A method of sintering the molded body is preferably performed with the molded body being held for a predetermined time in a temperature region involving generation of a liquid phase. A sintering temperature is preferably more than or equal to 1350° C. and less than or equal to 1500° C. A holding time is preferably more than or equal to 0.2 hour and less than 0.5 hour, and is more preferably more than or equal to 0.3 hour and less than or equal to 0.4 hours. An atmosphere during the sintering is preferably an atmosphere of inert gas such as nitrogen or argon or vacuum (about less than or equal to 0.5 Pa). Accordingly, by performing machining as required after obtaining the sintered material, the cemented carbide can be obtained as a final product. The cemented carbide obtained by such a production method can have an excellent reaction resistance against steel.

Here, the composition and atomic ratio in the powder of the composite carbonitride can be determined by a conventionally known component analysis technique. For example, an inductive plasma emission spectrometry method, a high-frequency combustion method, or a thermal conductivity method can be used to identify the composition (metal, carbon, nitrogen, and the like) in the powder and the contents thereof.

The average particle size of the powder of the composite carbonitride is preferably controlled to be more than or equal to 0.5 μm and less than or equal to 3.5 μm in order to attain ease of handling as well as an excellent reaction resistance against steel when applied as a cutting tool as described below. The average particle size of the powder of the composite carbonitride can be calculated by the same method as the method of measuring the average particle size of the third powder.

[Third Embodiment: Cutting Tool]

A cutting tool according to the present embodiment includes the cemented carbide according to the first embodiment. Since the cutting tool of the present embodiment includes the cemented carbide according to the first embodiment, the cutting tool can have an excellent reaction resistance against steel, in addition to an excellent mechanical strength intrinsic to cemented carbides.

Here, the cutting tool can be applied to a drill, an end mill, an indexable cutting insert for drill, an indexable insert for end mill, a throwaway insert for milling, a throwaway insert for turning, a metal saw, a gear cutting tool, a reamer, a tap, a cutting bite, a wear-resistant tool, a friction stir welding tool, and the like.

When the cutting tool is an indexable cutting insert or the like, the substrate may or may not include a chip breaker. The shape of a cutting edge ridgeline, which is a main portion for cutting a workpiece, includes any of a sharp edge (a ridge where a rake face and a flank face meet each other), a honed edge (a sharp edge processed to be rounded), a negative land (beveled), a combination of the honed edge and the negative land, and the like.

Figure 4:
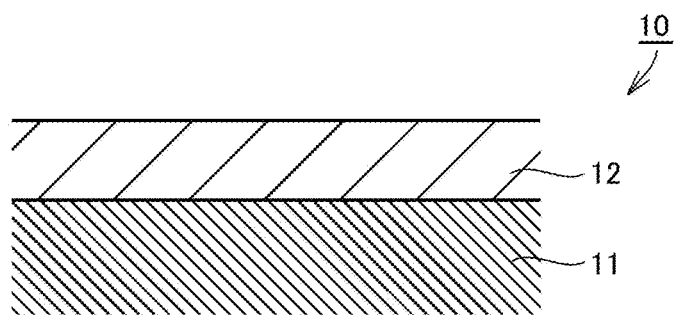
FIG. 4 is a partial cross sectional view showing an exemplary configuration of a cutting tool according to the present embodiment.

Further, the cutting tool according to the present embodiment includes: a substrate composed of the cemented carbide according to the first embodiment; and a coating film that coats this substrate. FIG. 4 is a partial cross sectional view showing an exemplary configuration of cutting tool 10 according to the present embodiment. As shown in FIG. 4, cutting tool 10 includes: a substrate 11 composed of the cemented carbide according to the first embodiment; and a coating film 12 that coats substrate 11 in contact with substrate 11. Since this cutting tool 10 further includes coating film 12, cutting tool 10 has more excellent wear resistance and breakage resistance, in addition to the excellent mechanical strength intrinsic to cemented carbides and the excellent reaction resistance against steel. Here, coating film 12 may coat the entire surface of substrate 11, or may coat only a portion thereof (for example, a cutting edge, which is a region that greatly contributes to a cuttability). Further, the composition of coating film 12 that coats substrate 11 should not be particularly limited, and a conventionally known coating film 12 can be appropriately employed. Examples of the composition of coating film 12 that coats substrate 11 include AlTiSiN, AlCrN, TiZrSiN, CrTaN, HfWSiN, CrAlN, TiN, TiBNO, TiCN, TiCNO, $TiB_2$, TiAlN, TiAlCN, TiAlON, TiAlONC, $Al_2O_3$, and the like.

For a method of coating, with the coating film, the substrate composed of the cemented carbide, a conventionally known method can be used. Examples thereof include a physical vapor deposition (PVD) method, a chemical vapor deposition (CVD) method, and the like. Particularly, for the PVD method, a resistive heating deposition method, an electron beam (EB) deposition method, a molecular beam epitaxy (MBE) method, an ion plating method, an ion beam deposition method, a sputtering method, or the like can be used, for example.

EXAMPLES

The following describes the present embodiment more specifically by way of examples. However, the present embodiment is not limited by these examples.

Example 1

<Production of Samples 1 to 7>
(First Step)
As the first powder, a $TiO_2$ powder (size of about 0.5 μm; provided by Kojundo Chemical Laboratory) and a $Nb_2O_5$ powder (size of about 1 μm; provided by Kojundo Chemical Laboratory) were prepared. As the second powder, a graphite powder (size of about 5 μm; provided by Kojundo Chemical Laboratory) was prepared. These were mixed at a blending ratio to obtain a composition shown in the column "Composition of First Composite Carbonitride" in Table 2, thereby obtaining the third powder (mixing step). The mixing was performed in accordance with a ball mill method.

Next, the third powder was granulated using an extrusion granulating machine (extrusion hole diameter: φ2.5 mm) to obtain granulated bodies having cylindrical shapes having an average diameter of 2.4 mm and an average length of about 10 mm (granulation step). The average diameter and average length of the granulated bodies were measured using a micrometer.

Next, by thermally treating the granulated body at 1800° C. in a nitrogen atmosphere using the above-described rotary kiln, a powder precursor composed of the first composite carbonitride was obtained (thermal treatment step). A time during which the granulated body passed through a heating section in the rotary kiln was about 30 minutes.

Finally, the powder precursor was dry-pulverized using a known pulverizer (a rolling ball mill with a cemented carbide ball of φ4.5 mm being used as a pulverizing medium), thereby obtaining a powder of the first composite carbonitride having a composition shown in the column "Composition of First Composite Carbonitride" in Table 2 (pulverization step). The composition of the first composite carbonitride of each sample was measured by the above-described method.

(Second Step)
A powder mixture was obtained by mixing, at a mass ratio shown in the column "First Composite Carbonitride:WC:Co (Mass Ratio)" in Table 1, the above-described powder of the first composite carbonitride, commercially available WC powder (trademark: "WC-25" provided by Japan New Metals), and commercially available Co powder (size of about 5 μm; provided by Kojundo Chemical Laboratory) serving as an iron group element powder. This mixing was performed by a wet ball mill method. The mixing time is shown in the column "Mixing Time" in Table 1.

(Third Step)
A molded body was obtained by granulating the above-described powder mixture using camphor and ethanol and performing press molding under a pressure of 1 ton weight/cm² (about 98 MPa).

(Fourth Step)
The molded body was sintered using a liquid phase sintering method under a vacuum (0.1 Pa) atmosphere with temperature and time shown in the column "Sintering Temperature (° C.)/Holding Time (Hour)" of "Fourth Step" in Table 1, thereby obtaining a sintered material. For example, in the case of sample 1, the molded body is sintered at a sintering temperature of 1400° C. for a holding time of 0.25 hour, thereby obtaining the sintered material. Next, a sintered skin of this sintered material was cut and removed using a diamond wheel of number (#) 400 (the number (#) means fineness of abrasive grains; as the number is larger, the abrasive grains are finer), thereby obtaining a cutting tool (each of samples 1 to 7) having a shape of SNGN120408 and composed of the cemented carbide.

TABLE 1

| | Second Step | | Fourth Step |
|---|---|---|---|
| Sample No. | First Composite Carbonitride:WC:Co (Mass Ratio) | Mixing Time | Sintering Temperature (° C.)/ Holding Time (Hour) |
| 1 | 0.5:8.5:1 | 16 | 1400/0.25 |
| 2 | 0.5:8.5:1 | 20 | 1370/0.5 |
| 3 | 0.5:8.5:1 | 18 | 1450/0.5 |
| 4 | 0.5:8.5:1 | 10 | 1480/1.5 |
| 5 | 0.5:8.5:1 | 13 | 1340/0.3 |
| 6 | 0.5:8.5:1 | 5 | 1400/0.2 |
| 7 | 0.5:8.5:1 | 12 | 1400/0.1 |

<Measurement>
(Composition)
In the obtained cutting tool (cemented carbide), the compositions of the core portion and peripheral portion of the second hard phase grain and the third hard phase grain were analyzed using EDX in accordance with the above-described method. The compositions of the core portion of the second hard phase grain and the third hard phase grain coincided with the composition of the first composite carbonitride shown in Table 2. The composition of the peripheral portion of the second hard phase grain is shown in the column "Composition of Peripheral Portion" in Table 2. It should be noted that by visual observation on the electron microscope image, it was confirmed that the peripheral portion coats at least a portion of the core portion.

(Degree of Dispersion of Second Hard Phase Grains and Third Hard Phase Grains and Percentage of Number of Third Hard Phase Grains)

In the obtained cutting tool (cemented carbide), the degree of dispersion of the second hard phase grains and the third hard phase grains and the percentage of the number of the third hard phase grains were calculated by the above-described methods. Results are shown in the column "Degree of Dispersion" and the column "Percentage of Number of Third Hard Phase Grains" in Table 2.

(Average Thickness of Peripheral Portions)

In the obtained cutting tool (cemented carbide), the average thickness of the peripheral portion was measured by the above-described method. Results are shown in the column "Average Thickness of Peripheral Portions (nm)" in Table 2.

(Average Grain Size of Core Portions and Average Grain Size of Third Hard Phase Grains)

In the obtained cutting tool (cemented carbide), the average grain size of the core portions and the average grain size of the third hard phase grains were measured by the above-described method. Results are shown in the column "Average Grain Size (μm) of Core Portions" and the column "Average Grain Size of Third Hard Phase Grains (μm)" in Table 2.

(Volume Ratios of Second Hard Phase Grains and Third Hard Phase Grains)

In the obtained cutting tool (cemented carbide), the volume ratios of the second hard phase grains and the third hard phase grains were measured by the above-described method. Results are shown in the column "Second Hard Phase Grains (volume %)" and the column "Third Hard Phase Grains (volume %)" in Table 2.

<Cutting Test>

The obtained cutting tool was subjected to a test for breakage resistance and a test for reaction resistance against steel under the following conditions.

(Test for Breakage Resistance)
Workpiece: SCM435 with a hole
Peripheral speed: 200 m/min
Feed: 0.5 mm/rev
Depth of cut: 2 mm
Cutting oil: none In the test for breakage resistance, the number of times of impacts (unit: the number of times) applied to the cutting edge in the cutting tool of each sample until breakage of the cutting edge was confirmed by way of a dynamometer and cutting noise was determined as a life. As the number of times of impacts is larger, it is evaluated that the breakage resistance is more excellent. Results are shown in the column "Breakage Resistance (Number of Times)" in Table 3.

(Test for Reaction Resistance Against Steel)
Workpiece: SCM435
Peripheral speed: 100 m/min
Feed: 0.15 mm/rev
Depth of cut: 1.5 mm
Cutting oil: none In the test for reaction resistance against steel, a cutting time (minute as a unit) until the flank wear width of the cutting edge of the cutting tool of each sample became more than or equal to 0.2 mm was measured in order to evaluate welding wear. As this time is longer, the reaction resistance against steel is evaluated to be more excellent. Results are shown in the column "Reaction Resistance against Steel (Minute)" in Table 3.

TABLE 3

| Sample No. | Cutting Test | |
|---|---|---|
| | Breakage Resistance (Number of Times) | Reaction Resistance against Steel (Minute) |
| 1 | 10328 | 26.2 |
| 2 | 9789 | 30.3 |
| 3 | 11244 | 28.9 |
| 4 | 6331 | 11.3 |
| 5 | 2345 | 18.4 |
| 6 | 8278 | 15.3 |
| 7 | 6908 | 20.8 |

TABLE 2

| Sample No. | Composition of First Composite Carbonitride | Composition of Peripheral Portion | Average Thickness of Peripheral Portions (nm) | Average Grain Size of Core Portions (μm) | Average Grain Size of Third Hard Phase Grains (μm) | Second Hard Phase Grains (Volume %) | Third Hard Phase Grains (Volume %) | Degree of Dispersion | Percentage of Number of Third Hard Phase Grains (%) |
|---|---|---|---|---|---|---|---|---|---|
| 1 | $Ti_{0.85}Nb_{0.15}C_{0.55}N_{0.45}$ | $Ti_{0.84}Nb_{0.14}W_{0.2}C_{0.55}N_{0.45}$ | 42 | 1.0 | 1.2 | 5 | 12 | 7 | 10 |
| 2 | $Ti_{0.85}Nb_{0.15}C_{0.55}N_{0.45}$ | $Ti_{0.84}Nb_{0.15}W_{0.1}C_{0.52}N_{0.48}$ | 32 | 0.9 | 1.4 | 7 | 12 | 4 | 12 |
| 3 | $Ti_{0.85}Nb_{0.15}C_{0.50}N_{0.50}$ | $Ti_{0.85}Nb_{0.14}W_{0.1}C_{0.50}N_{0.50}$ | 49 | 0.8 | 1.1 | 4 | 8 | 5 | 8 |
| 4 | $Ti_{0.84}Nb_{0.16}C_{0.65}N_{0.35}$ | $Ti_{0.83}Nb_{0.12}W_{0.5}C_{0.55}N_{0.45}$ | 83 | 1.6 | 1.9 | 8 | 15 | 19 | 9 |
| 5 | $Ti_{0.85}Nb_{0.15}C_{0.55}N_{0.45}$ | $Ti_{0.84}Nb_{0.14}W_{0.2}C_{0.55}N_{0.45}$ | 8 | 0.9 | 1.2 | 5 | 10 | 13 | 6 |
| 6 | $Ti_{0.85}Nb_{0.15}C_{0.55}N_{0.45}$ | $Ti_{0.84}Nb_{0.14}W_{0.2}C_{0.55}N_{0.45}$ | 66 | 1.8 | 1.7 | 5 | 4 | 17 | 5 |
| 7 | $Ti_{0.85}Nb_{0.15}C_{0.55}N_{0.45}$ | $Ti_{0.84}Nb_{0.14}W_{0.2}C_{0.55}N_{0.45}$ | 27 | 1.3 | 1.8 | 3 | 7 | 17 | 3 |

<Analysis>

Each of samples 1 to 3 corresponds to an example of the present disclosure. Each of samples 4 to 6, in each of which the degree of dispersion is more than 10, corresponds to a comparative example. Sample 7, in which the degree of dispersion is more than 10 and the percentage of the number of the third hard phase grains is less than 5%, corresponds to a comparative example. It was confirmed that each of the cutting tools of samples 1 to 3 (examples of the present disclosure) has more excellent breakage resistance and reaction resistance against steel than those of the cutting tools of samples 4 to 7 (comparative examples).

Heretofore, the embodiments and examples of the present disclosure have been illustrated, but it has been initially expected to appropriately combine the configurations of the embodiments and examples and modify them in various manners.

The embodiments and examples disclosed herein are illustrative and non-restrictive in any respect. The scope of the present invention is defined by the terms of the claims, rather than the embodiments and examples described above, and is intended to include any modifications within the scope and meaning equivalent to the terms of the claims.

REFERENCE SIGNS LIST

1: first hard phase grain; 2: second hard phase grain; 21: core portion; 22: peripheral portion; 3: third hard phase grain; 4: metal binder phase; 5: cemented carbide; 10: cutting tool; 11: substrate; 12: coating film; R: unit region

The invention claimed is:

1. A cemented carbide comprising first hard phase grains, second hard phase grains, third hard phase grains, and a metal binder phase, wherein
   each of the first hard phase grains includes tungsten carbide,
   each of the second hard phase grains has a core portion in a form of a grain and a peripheral portion that coats at least a portion of the core portion,
   the core portion is composed of a first composite carbonitride represented by $Ti_{1-X-Z}Nb_XM_ZC_{1-Y}N_Y$,
   the peripheral portion is composed of a second composite carbonitride, the second composite carbonitride being a carbonitride that has a composition different from a composition of the core portion and that at least includes titanium, niobium, and tungsten,
   the M represents at least one element selected from a group consisting of vanadium, chromium, and molybdenum,
   the X is more than or equal to 0.1 and less than or equal to 0.2,
   the Y is more than or equal to 0.3 and less than or equal to 0.6,
   the Z is more than or equal to 0 and less than or equal to 0.02,
   each of the third hard phase grains consisting of the first composite carbonitride,
   the metal binder phase includes an iron group element,
   the cemented carbide has a total of 70 unit regions,
   the total of 70 unit regions are provided by continuously arranging 7 unit regions in a longitudinal direction and 10 unit regions in a lateral direction in an electron microscope image obtained by imaging an arbitrary cross section of the cemented carbide at a magnification of 1500×, each of the unit regions being constituted of a square having each side of 8 μm,
   the number of unit regions each having a percentage of less than 0.43% or more than 2.43% is less than or equal to 10 among the total of 70 unit regions,
   the percentage is a percentage of the total number of the number of the second hard phase grains and the number of the third hard phase grains in each unit region with respect to the total number of the number of the second hard phase grains and the number of the third hard phase grains in the total of 70 unit regions,
   the number of the second hard phase grains in the unit region is the number of second hard phase grains having core portions each having a grain size of more than or equal to 0.2 μm and less than or equal to 3 μm in the unit region,
   the number of the third hard phase grains in the unit region is the number of third hard phase grains each having a grain size of more than or equal to 0.5 μm and less than or equal to 2.5 μm in the unit region, and
   in a total of 10 unit regions existing in a fourth row of the total of 70 unit regions in the longitudinal direction in the cemented carbide, a percentage of the number of the third hard phase grains each having a grain size of more than or equal to 0.5 μm and less than or equal to 2.5 μm with respect to the total number of the number of the second hard phase grains having the core portions each having a grain size of more than or equal to 0.2 μm and less than or equal to 3 μm and the number of the third hard phase grains each having a grain size of more than or equal to 0.5 μm and less than or equal to 2.5 μm is more than or equal to 5% and less than or equal to 15%.

2. The cemented carbide according to claim 1, wherein an average thickness of the peripheral portions is more than or equal to 10 nm and less than or equal to 100 nm.

3. The cemented carbide according to claim 1, wherein an average grain size of the core portions is more than or equal to 0.2 μm and less than or equal to 2 μm.

4. The cemented carbide according to claim 1, wherein an average grain size of the third hard phase grains is more than or equal to 0.5 μm and less than or equal to 2.5 μm.

5. The cemented carbide according to claim 1, wherein the cemented carbide includes more than or equal to 2 volume % and less than or equal to 10 volume % of the second hard phase grains.

6. The cemented carbide according to claim 1, wherein the cemented carbide includes more than or equal to 3 volume % and less than or equal to 20 volume % of the third hard phase grains.

7. A cutting tool comprising the cemented carbide recited in-claim 1.

8. The cutting tool according to claim 7, comprising: a substrate composed of the cemented carbide; and a coating film that coats the substrate.

* * * * *